Patented May 5, 1931

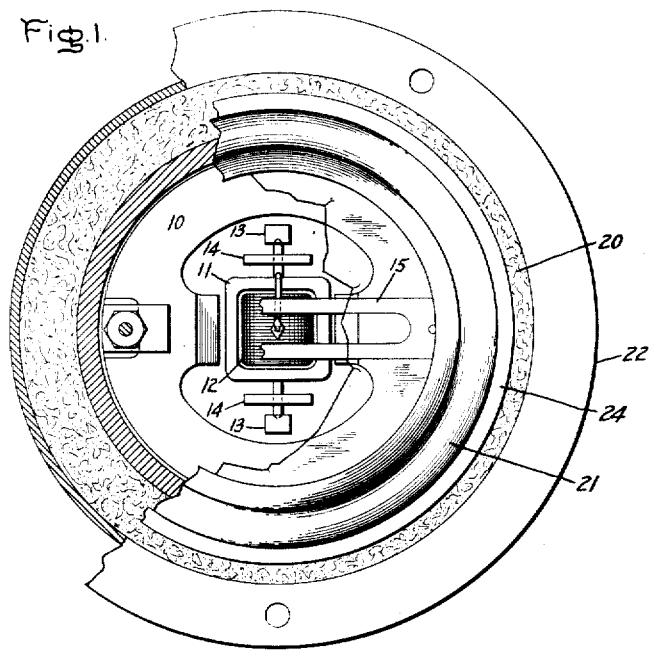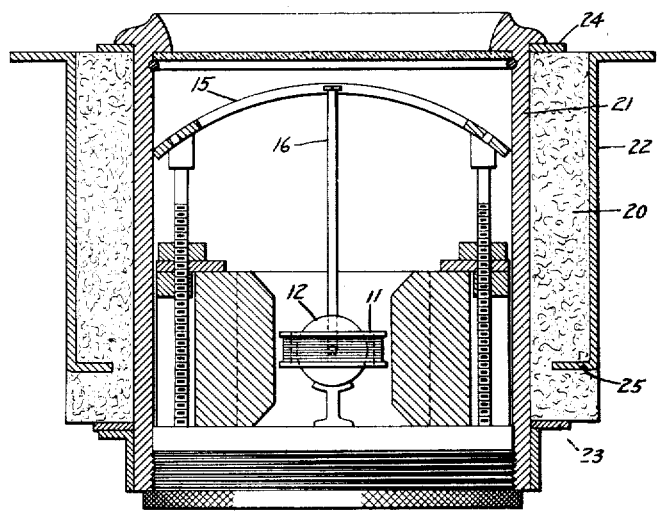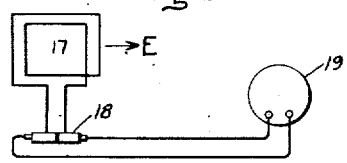

1,804,330

UNITED STATES PATENT OFFICE

HAROLD T. FAUS, OF LYNN, MASSACHUSETTS, ASSIGNOR TO GENERAL ELECTRIC COMPANY, A CORPORATION OF NEW YORK

ELECTRIC MEASURING INSTRUMENT

Application filed September 6, 1929. Serial No. 390,826.

My invention relates to electric measuring instruments of the type having a stationary permanent magnet field and movable coil armature and relates to structural features for improving the sensitivity of such instruments, reducing the size, and preventing interference from vibration.

One of the objects of my invention is to provide a highly sensitive electric measuring instrument suitable for use on aircraft where the space available for mounting is small but where it is essential to have an instrument scale distribution and visibility consistent with the required high accuracy of the instrument.

In order to obtain a rugged D'Arsonval type instrument of high sensitivity and good damping suitable for use on aeroplanes, it is desirable to have a strong permanent magnet. However, the limitation as to the size of the instrument makes it necessary to so design the magnetic circuit as to obtain a magnet having a maximum strength for a minimum diameter. In accordance with my invention I accomplish this by providing an annular magnet with inwardly projecting poles. This type of magnet has a double magnetic circuit between the pole pieces. The magnet has a relatively large cross-section, short magnetic circuit and large air gap particularly adapted to take advantage of the high coercive force of cobalt steel the use of which assists in obtaining the results desired. I also place the axis of the moving coil armature parallel to the plane of the annular magnet which allows the use of a long pointer and large scale for the size of the instrument. Another feature is the use of a special case arranged to cushion the entire instrument against vibration.

The features of my invention which are believed to be novel and patentable will be pointed out in the claims appended hereto. For a better understanding of my invention reference is made in the following description to the accompanying drawing which shows in Fig. 1 a front view of the instrument partially in horizontal section; Fig. 2 shows a sectional view through the central portion of Fig. 1; and Fig. 3 represents the circuit connections of the instrument as employed for use as an earth inductor compass for aeroplane work.

Referring to the drawing the stationary permanent magnet field member 10 is annular in shape and surrounds the armature coil 11. The field magnet is preferably a solid casting of cobalt steel, the inwardly projecting pole pieces being integral with the annular body. The upper and lower halves of the annular portion are magnetized to produce fluxes in the same direction through the armature between the pole pieces. I thus obtain a double magnetic circuit and a very strong magnetic field for the size of the magnet. The pole pieces adjacent the armature are preferably reduced as shown to confine the flux to the armature air gap. The usual stationary cylindrical core 12 is provided within the armature coil. The armature coil 11 is suitably supported in bearings 13 and spiral spring conductors 14 serve to lead the current to the movable coil and furnish the zero restoring torque. It will be noted that the armature mounting is entirely within the magnet. The zero point of the scale is at the center.

Contrary to the usual arrangement in D'Arsonval type instruments I have made the axis of rotation of the armature parallel to the plane of the permanent magnet and parallel to the scale 15. 16 represents the pointer the outer end of which swings in the arc of a circle which is substantially the center of the magnet. This brings the scale well to the front of the instrument on a horizontal line with the central or important point of the scale nearest the observer. This makes for an easy reading scale with a small rugged instrument of high sensitivity and good damping. The instrument as thus designed is suitable for measuring small electric currents with high accuracy.

It has been designed particularly for the indicating instrument of an earth inductor compass for aircraft. A schematic connection diagram for such application is represented in Fig. 3 where 17 represents a coil which is rotated in the earth field. This coil is connected to a commutator 18 and a direct current voltage is generated. The commutator is provided with brushes which are connected to my measuring instrument represented at 19. The voltage supplied to the instrument 19 will depend upon the relative position of the brushes with respect to the direction of the earth's magnetic field. For example, if we assume the arrow E represents east, the coil 17 in the position shown will cut no flux lines since the earth field is at right angles thereto. Therefore, in the position shown it will be assumed that the brushes are at the no voltage position on the commutator. Movement of the brushes in one direction with respect to the direction of the earth field will produce a voltage in one direction and movement in the opposite direction will reverse this voltage. As usually employed, the apparatus is set to produce no voltage when the aircraft is traveling in the desired direction at which time the instrument reads zero at the center of the scale. Any deviation from the correct direction will produce an instrument reading to the right or left, depending upon the direction and extent of deviation. The pilot after setting the aeroplane compass for a certain direction of flight will therefore guide his plane so that the pointer 16 remains in the center of the scale.

The above brief discussion of the use of the earth inductor compass is given to illustrate the character of measuring instrument necessary to obtain reliable results. The instrument used should be highly sensitive and have good damping for aeroplane work of this character. The importance of a clearly visible indication at the central range is apparent and the exacting space requirements for aeroplane instrument panels needs no further comment. These requirements are satisfied in the instrument of my invention.

It is also advisable to protect high accuracy instruments of this character from the rather severe vibration met with on aeroplanes and to this end I provide a cushion layer 20 between the cylindrical instrument casing 21 and an outer cylindrical casing 22. This cushion may comprise felt packing held in place by suitable flanges 23, 24 and 25 on the outer and inner casings respectively.

The instrument itself is mounted on a base 26 screwed into or otherwise secured into and removable from the back of the casing without disturbing the mounting of the casing in the panel or the cushioning relation between the casings.

Having thus described the essential novel features of my invention and mentioned a specific application I desire to have it understood that such other modifications and applications as are commensurate with the scope of the invention are intended to be included in the appended claims.

What I claim as new and desire to secure by Letters Patent of the United States, is:

1. An electric measuring instrument of the D'Arsonval type comprising an annular permanent magnet having inwardly projecting pole pieces and a moving coil armature between said pole pieces having a shaft with its axis of rotation parallel to the plane of the magnet, and pivots for the two ends of said shaft between opposite inside walls of said annular magnet.

2. In an electric measuring instrument of the D'Arsonval type, an annular permanent magnet having inwardly projecting pole pieces, said magnet and pole pieces comprising an integral casting of cobalt steel, a moving coil provided with a shaft and pivots therefor located entirely within the inner periphery of said annular casting.

3. An electric measuring instrument of the D'Arsonval type comprising an annular permanent magnet with a pair of inwardly projecting pole pieces on one diameter of the magnet and a moving coil armature pivotally mounted within said magnet with its axis of rotation on a diameter of the magnet at right angles to the first mentioned diameter.

4. An electric measuring instrument of the D'Arsonval type comprising an annular permanent magnet of cobalt steel having inwardly projecting pole pieces, and a moving coil armature mounted for rotation with the shaft on an axis parallel to the plane of the magnet between said pole pieces, and pivots for the two ends of the shaft located within the annular magnet.

5. An electric measuring instrument having an annular permanent magnet with inwardly projecting pole pieces on one diameter, an armature between said pole pieces pivoted for rotation on a diameter of the annular magnet at right angles to the first mentioned diameter, a pointer for said instrument, the outer end of which swings in the arc of a circle, the center of which is substantially the center of the magnet, and a scale with which said pointer cooperates.

6. An electric measuring instrument having an inner casing supporting the instrument and an outer casing for attachment to a panel and a cushion packing between said casings for protecting the instrument from vibration.

7. An electric measuring instrument having an inner casing supporting the instrument, an outer casing for attachment to a panel, a cushioning packing between said casings for protecting the instrument from vibration, the instrument being removable from the inner casing without disturbing the cushioning relation between the inner and outer casings.

8. An electric measuring instrument having an inner cylindrical casing with a front window cover and a rear closing cover, an outer cylindrical casing surrounding the cylindrical portion of the inner casing for attachment to a panel, a cushion packing between said casings for protecting the instrument from vibration, the rear closing cover of said instrument supporting the instrument on its inner surface and being removable from the rear of the inner casing without disturbing the cushioning relation between outer and inner casings.

In witness whereof, I have hereunto set my hand this 3rd day of September, 1929.

HAROLD T. FAUS.

outer cylindrical casing surrounding the cylindrical portion of the inner casing for attachment to a panel, a cushion packing between said casings for protecting the instrument from vibration, the rear closing cover of said instrument supporting the instrument on its inner surface and being removable from the rear of the inner casing without disturbing the cushioning relation between outer and inner casings.

In witness whereof, I have hereunto set my hand this 3rd day of September, 1929.

HAROLD T. FAUS.

DISCLAIMER 1,804,330.—*Harold T. Faus*, Lynn, Mass. ELECTRIC MEASURING INSTRUMENT. Patent dated May 5, 1931. Disclaimer filed November 11, 1937, by the assignee, *General Electric Company*.

Hereby enters this disclaimer to claim 6 of said Letters Patent.

[*Official Gazette December 7, 1937.*]

DISCLAIMER 1,804,330.—*Harold T. Faus*, Lynn, Mass. ELECTRIC MEASURING INSTRUMENT. Patent dated May 5, 1931. Disclaimer filed November 11, 1937, by the assignee, *General Electric Company*.

Hereby enters this disclaimer to claim 6 of said Letters Patent.

[*Official Gazette December 7, 1937.*]